United States Patent
Tymus

(10) Patent No.: US 9,742,457 B2
(45) Date of Patent: Aug. 22, 2017

(54) ELECTRONIC DEVICE PRIVACY CASE

(71) Applicant: Roderick Tymus, Columbia, MD (US)

(72) Inventor: Roderick Tymus, Columbia, MD (US)

( * ) Notice: Subject to any disclaimer, the term of this patent is extended or adjusted under 35 U.S.C. 154(b) by 30 days.

(21) Appl. No.: 15/040,234

(22) Filed: Feb. 10, 2016

(65) Prior Publication Data

US 2016/0269068 A1  Sep. 15, 2016

Related U.S. Application Data

(60) Provisional application No. 62/130,005, filed on Mar. 9, 2015.

(51) Int. Cl.
*H04B 1/3888* (2015.01)

(52) U.S. Cl.
CPC .................. *H04B 1/3888* (2013.01)

(58) Field of Classification Search
CPC ............................ H04B 1/3827; H04B 1/3888
See application file for complete search history.

(56) References Cited

U.S. PATENT DOCUMENTS

| | | | |
|---|---|---|---|
| 7,639,237 B2 | 12/2009 | Perkins | |
| 8,433,377 B1 | 4/2013 | Oh et al. | |
| 8,628,197 B2 | 1/2014 | Estevez et al. | |
| 8,700,107 B1 * | 4/2014 | Oh | H04M 1/04 381/322 |
| 2004/0171411 A1 | 9/2004 | Shimoda et al. | |
| 2008/0018603 A1 | 1/2008 | Baraz et al. | |
| 2012/0037536 A1 * | 2/2012 | Lonsdale, II | G06F 1/16 206/701 |

* cited by examiner

*Primary Examiner* — Wesley Kim
*Assistant Examiner* — Dong-Chang Shiue
(74) *Attorney, Agent, or Firm* — Global Intellectual Property Agency, LLC; Daniel Boudwin

(57) ABSTRACT

An electronic device privacy case. The electronic device privacy case includes a tray configured to store an electronic device having a display. A pair of foldable side panels extend upward from the tray and connect to support members, each of which are hingedly connected at one end to the tray via a locking hinge. A top panel is slidably disposed within channels in the support members and connected at one end to a rotatable shaft disposed in a housing attached to one end of the tray. The top panel may be retracted and rolled up along the rotatable shaft or may be extended to obscure the display from view. Further, the foldable side panels may be in a stored configuration within the tray, or may be lifted to a deployed configuration in order to prevent other individuals in public from viewing the display of the electronic device.

12 Claims, 3 Drawing Sheets

ELECTRONIC DEVICE PRIVACY CASE

CROSS REFERENCE TO RELATED APPLICATIONS

This application claims the benefit of U.S. Provisional Application No. 62/130,005 filed on Mar. 9, 2015. The above identified patent application is herein incorporated by reference in its entirety to provide continuity of disclosure.

BACKGROUND OF THE INVENTION

The present invention relates to electronic device cases. More particularly, the present invention relates to electronic device cases that provide optional deployable privacy panels.

Many individuals utilize portable electronic devices having display screens such as smartphones, laptops, tablets, and the like. Such devices often include an internet connection and a memory storage in order to provide a means for communication and accessing information in public locations. These portable electronic devices are often utilized for viewing sensitive information such as billing information, credit card information, addresses, medical records, and other private information.

Individuals accessing sensitive materials or information in public places often do not wish the information to be viewable to passersby. For example, an individual paying a credit card bill or other type of bill would not wish their personal financial information to be viewed by a stranger. Individuals are often forced to move to a hidden location to view the private information, which can be time-consuming and inconvenient. Individuals unable to relocate may be forced to use their hand or an object to block the view of the screen from others, which is often ineffective and requires the individual to maintain an uncomfortable body position. Therefore, it is desirable to provide a case for a portable electronic device that provides users with optionally deployable privacy panels that obscure the view of a display screen from the general public and provide a private viewing area for the user.

SUMMARY OF THE INVENTION

The present invention provides an electronic device privacy case wherein the same can be utilized for providing convenience for the user who desires privacy when utilizing an electronic device such as a cellphone, smartphone, tablet, laptop, or other portable electronic device. The electronic device privacy case comprises a rectangular tray having a first end and a second end opposite the first end, further having peripheral sidewalls extending from a recessed surface. A housing having an opening for accessing an interior volume therein is disposed on the first end of the tray, and the interior volume has a rotatable shaft disposed therein. A pair of foldable side panels each having an upper end and a lower end are each attached to the recessed surface of the tray at the lower end. A pair of support members having distal and proximal ends are attached to the upper end of each foldable side panel, wherein the proximal end of each of the support members is hingedly attached to the first end of the tray via a locking hinge, and wherein each of the support members has a channel through a length thereof. Further, a top panel having a connecting end, a free end, and opposing edges, wherein each of the opposing edges is slidably disposed within the channel of each of the of the support members, is connected at the connecting end to the rotatable shaft.

One object of the present invention is to provide an electronic device case having a plurality of privacy panels that obscure the display screen of the electronic device when the privacy panels are deployed.

Another object of the present invention is to provide an electronic device case having privacy panels that may be stored when not needed.

A further object of the present invention is to provide an electronic device privacy case having apertures for accepting connecting cables therethrough in order to connect cables such as power and headphone cables to the electronic device.

Yet another object of the present invention is to provide an electronic device case having privacy panels that are configured to completely obscure a display screen from view.

Still a further object of the present invention is to provide an electronic device privacy case that prevents individuals other than the user from observing a display screen while still allowing the user to access the controls of the electronic device.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
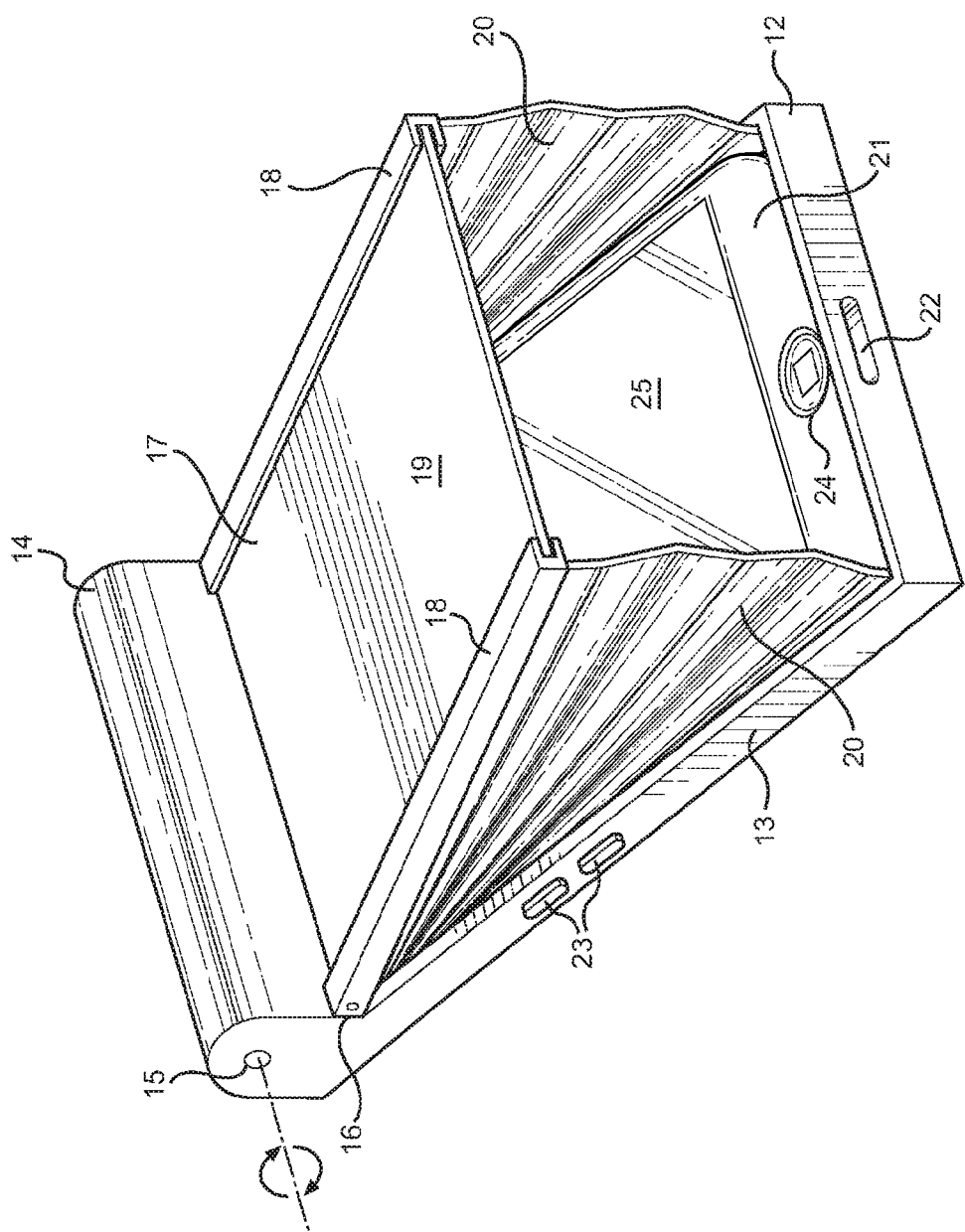
FIG. 1 shows a perspective view of an electronic device privacy case according to the present invention with the top panel extended and side panels in a deployed configuration.

Reference is made herein to the attached drawings. Like reference numerals are used throughout the drawings to depict like or similar elements of the electronic device privacy case. For the purposes of presenting a brief and clear description of the present invention, the preferred embodiment will be discussed as used for a smartphone. However, the present invention may be utilized with any type of portable electronic device having a display screen such as a cellphone, tablet, laptop, or the like. The figures are intended for representative purposes only and should not be considered to be limiting in any respect.

Figure 2:
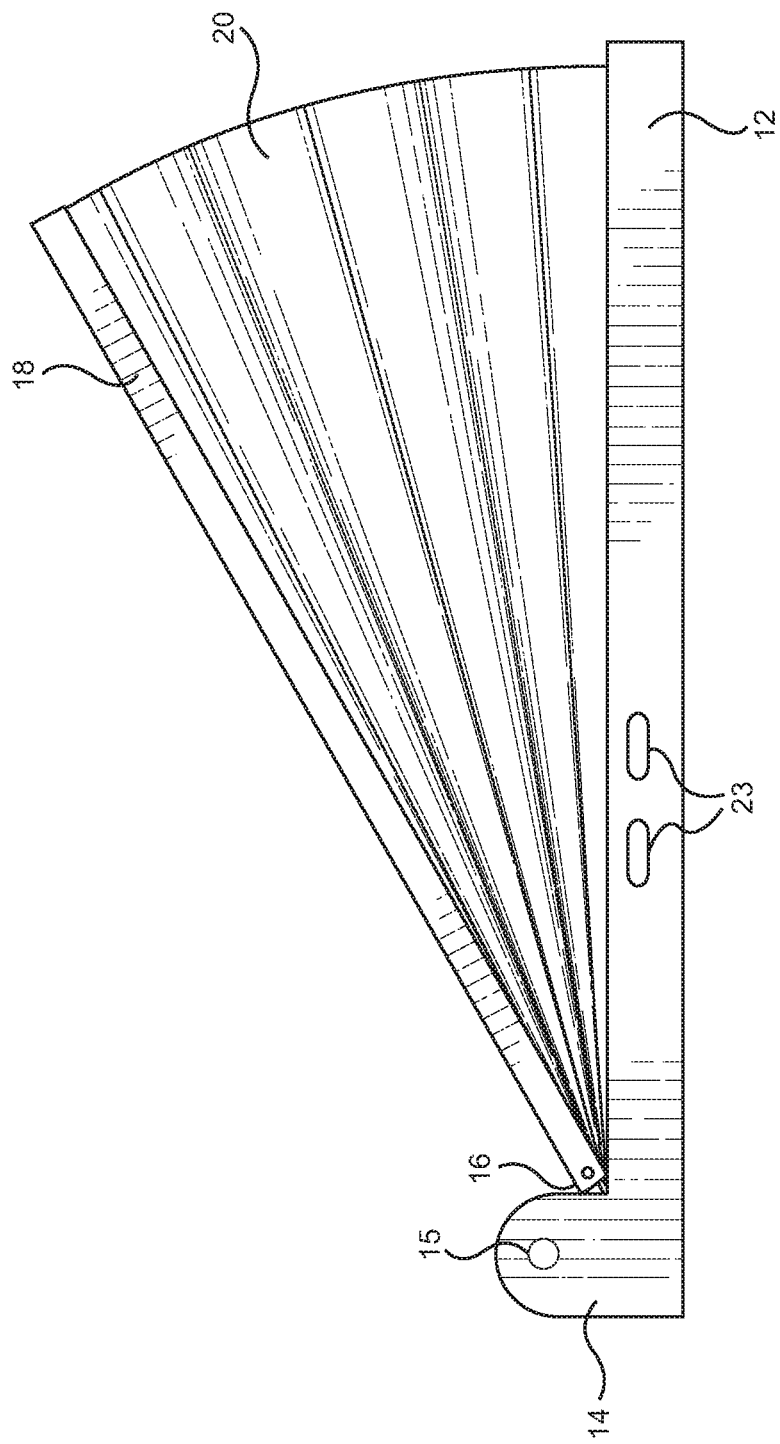
FIG. 2 shows a side view of an of an electronic device case according to the present invention with the top panel extended and side panels in a deployed configuration.

Referring now to FIGS. 1 and 2, there is shown a perspective view and a side view of an electronic device case according to the present invention with the top panel extended and side panels in a deployed configuration. The electronic device case generally comprises a tray 12 having peripheral sidewalls 13 extending from a recessed upper surface of the tray (not visible). The tray 12 is preferably rectangular in shape and is configured to accept an electronic device 21 and secure it in place via a friction fit between the peripheral sidewalls 13. The bottom surface of the electronic device is supported by the recessed surface of the tray 12.

In one embodiment of the invention, the peripheral sidewalls 13 may comprise accessory apertures 22 disposed thereon. The accessory apertures 22 allow users to access ports on the electronic device such as a charging port or headphone port in order to connect various cables thereto. The peripheral sidewalls 13 may further comprise raised buttons 23. The raised buttons 23 are disposed along the sidewalls 13 such that they are positioned adjacent to a button on the electronic device 21, which is depicted herein as a smartphone. The user may depress the raised buttons 23 which in turn depress underlying buttons on the electronic device 21 such as a volume control. This allows users to access the various controls of the electronic device while it is stored within the tray 12.

A pair of foldable side panels 20 having a lower end and an upper end are each attached at a lower end to the recessed upper surface of the tray 12 adjacent to inner edges of the peripheral sidewalls 13. A pair of support members 18 are each attached to the upper end of the foldable side panels 20. The foldable side panels 20 are each configured to maintain a stored position folded within the tray 12 or a deployed configuration wherein the foldable side panels 20 are unfolded. When stored within the tray 12, the foldable side panels 20 are folded adjacent to the inner edge of the peripheral sidewalls 13 and are concealed therein by the peripheral sidewalls 13 and the support members 18.

Each of the support members 18 is further hingedly connected to the first end of the tray 12 via a hinge 16. The hinge 16 is preferably a locking hinge having a locking mechanism such as a latch or a clip that holds each of the support members 18 in a raised position. When the support members 18 are in a raised position, the foldable side panels 20 are unfolded to the deployed configuration, whereby the foldable side panels 20 extend upward from the recessed surface of the tray 12. In the deployed configuration, the foldable side panels 20 block the display 25 from being viewed from either side of the user.

Each of the support members 18 has a channel disposed throughout the length thereof. The channel preferably comprises a U-shape formed by a first edge and second edge of the channel. A top panel 17 is connected at a connecting end to the rotatable shaft 15. The top panel further comprises opposing edges which are slidably disposed within the channel of each support member 18. The top panel 17 may be slid along the channels toward either the first end or second end of the tray 12. Movement toward the first end causes the rotatable shaft 15 to rotate and wind the top panel 17 thereon. The top panel 17 enters the housing 14 through an opening (not visible) and is rolled up along the rotatable shaft 15 to a retracted position within the housing 14.

The top panel 17 may also be slid along the channels away from the housing 14 to an extended position, which causes the rotatable shaft 15 to rotate in an opposite direction and unroll the top panel 17. When in an extended position, an upper surface 19 of the top panel obscures the display 25 from view from above or in front of a user. Further, the top panel 17 may be lifted upward when in an extended position in order to raise the support members 18, which in turn causes the foldable side panels 20 to unfold to a deployed configuration. When the foldable side panels 20 are in a deployed configuration, the display 25 is obscured from view from the sides. Users may view the display 25 discretely and still have access to buttons 24 on the electronic device. This allows the user to utilize the full functionality of the electronic device while keeping the display 25 obscured from public view.

Figure 3:
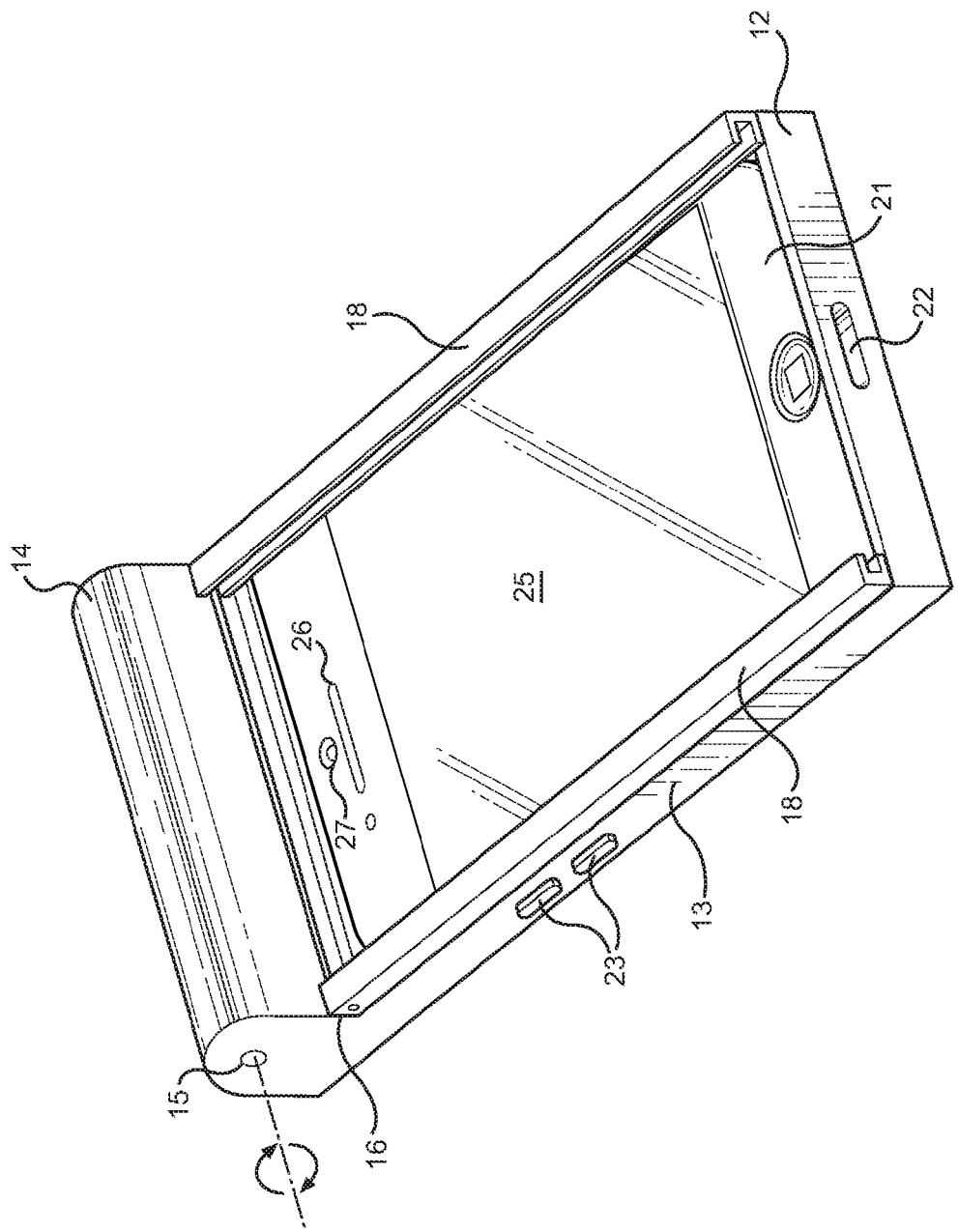
FIG. 3 shows a perspective view of an electronic device case according to the present invention with the top panel extended and side panels in a stored configuration.

Referring now to FIG. 3, there is shown a perspective view of an electronic device case according to the present invention with the top panel retracted and side panels in a stored configuration. The foldable side panels 20 are configured to fold down to a stored configuration where they are obscured from view by the peripheral sidewalls 13 and the support members 18. The top panel (not visible) may be stored along the rotatable shaft 15 within the housing 14 when the foldable side panels 20 are in a stored configuration.

When the top panel is retracted and the foldable side panels 20 are in a stored configuration, the privacy case acts as a conventional case. Users may then utilize functions such as a camera 27 that would otherwise be covered by the top panel. Users may also hold the smartphone to their ear to make phone calls utilizing a speaker 26 when the top panel is retracted. Alternatively, users may completely extend the top panel when the side panels 20 are in a stored configuration in order to obscure both the display 25 and other various portions of the smartphone such as the camera 27 and speaker 26 also located on the upper surface of the smartphone.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic device privacy case, comprising:
    a rectangular tray having a first end, a second end opposing the first end, and peripheral sidewalls extending from a recessed surface;
    a pair of foldable side panels each having an upper end and a lower end, wherein each lower end is attached to the recessed surface of the tray, and wherein each foldable side panel is configured to maintain either one of a folded stored position or an unfolded deployed position;
    a pair of support members each having a distal end and a proximal end attached to the upper end of each foldable side panel, wherein the proximal end of each of the support members is hingedly attached to the tray via a locking hinge; and wherein each of the support members have a channel through a length thereof; and
    a top panel removably wound on a rotating shaft disposed at the first end of the tray, wherein the top panel comprises a connecting end, a free end, and opposing edges, each of the opposing edges slidably disposed within the channel of each of the of the support members, wherein the top panel is connected at the connecting end to the rotatable shaft, and wherein the top panel is configured to maintain either one of a wound retracted position or an unwound extended position.

2. The electronic device privacy case of claim 1, further comprising a housing having an interior volume disposed on the first end of the tray, wherein the rotatable shaft is disposed within the interior volume of the housing.

3. The electronic device privacy case of claim 2, wherein the top panel is slidable through the opening of the housing toward the first end of the tray.

4. The electronic device privacy case of claim 1, wherein the top panel is wound around the rotatable shaft when in the stored position.

5. The electronic device privacy case of claim 1, wherein the peripheral sidewalls of the tray further comprise one or more apertures disposed therethrough, wherein the one or more apertures are adapted to allow for the insertion of accessory cables.

6. The electronic device privacy case of claim 1, wherein an electronic device is securable within the tray via a friction fit, and wherein a bottom surface of the electronic device is supported by the recessed surface of the tray.

7. The electronic device privacy case of claim 1, wherein the each of the channels form a U-shape opening.

8. The electronic device privacy case of claim 1, wherein each of the foldable side panels is configured to collapse into a stored configuration resting within the tray adjacent to an inner edge of the peripheral sidewalls.

9. The electronic device privacy case of claim 1, wherein each of the foldable side panels is concealed by the support members and the peripheral sidewalls of the base when in the stored configuration.

10. The electronic device privacy case of claim 1, wherein each of the foldable side panels is supported in a raised position by the support member when in the deployed configuration.

11. The electronic device privacy case of claim 10, and wherein each of the side panels is supported by the locking hinge in a raised position when the side panel is in the deployed configuration.

12. The electronic device privacy case of claim 1, wherein the free end of the top panel is depressible in a downward direction when top panel is in an extended position and the side panels are in a deployed configuration.

* * * * *